United States Patent [19]

Sowa

[11] Patent Number: 5,619,572
[45] Date of Patent: Apr. 8, 1997

[54] METHOD AND APPARATUS FOR PROVIDING SECURE COMMUNICATIONS FOR A REQUESTED CALL

[75] Inventor: Hans C. Sowa, Schaumburg, Ill.

[73] Assignee: Motorola, Inc., Schaumburg, Ill.

[21] Appl. No.: 261,373

[22] Filed: Jun. 16, 1994

[51] Int. Cl.⁶ .................................................. H04L 9/00
[52] U.S. Cl. .................................. 380/21; 380/9; 380/49
[58] Field of Search ................................. 380/9, 21, 49

[56] References Cited

U.S. PATENT DOCUMENTS

| | | | |
|---|---|---|---|
| 4,965,804 | 10/1990 | Trbovich et al. | 380/21 |
| 5,093,860 | 3/1992 | Steinbrenner et al. | 380/21 |
| 5,146,497 | 9/1992 | Bright | 380/21 |
| 5,150,408 | 9/1992 | Bright | 380/21 |
| 5,173,938 | 12/1992 | Steinbrenner et al. | 380/21 |
| 5,325,432 | 6/1994 | Gardeck et al. | 380/21 |
| 5,381,479 | 1/1995 | Gardeck et al. | 380/21 |

*Primary Examiner*—Bernarr E. Gregory
*Attorney, Agent, or Firm*—James A. Coffing; George C. Pappas

[57] ABSTRACT

A secure communication system (100) that is capable of over-the-air-rekeying (OTAR) employs a key management controller (108) to provide secure communications for a requested call. The key management controller determines (403) when the requested call has been initiated and identifies (405) some of the plurality of radios as being members of the requested call. A call key is then transmitted (409) to the members of the requested call where it is used (514) for the duration of the requested call. In this manner, secure communications between the members of the requested call is provided.

10 Claims, 3 Drawing Sheets

METHOD AND APPARATUS FOR PROVIDING SECURE COMMUNICATIONS FOR A REQUESTED CALL

FIELD OF THE INVENTION

The present invention relates generally to secure radio communication systems and in particular to a method of providing secure communications for a requested call.

BACKGROUND OF THE INVENTION

Secure radio communication systems are known in the telecommunications art. Security is generally provided in such systems through the use of encryption keys, also known in the art, to facilitate the decoding of transmitted information (e.g., voice, data) that has been encrypted. Each radio in a secure communication system typically includes one or memory elements for storing a multitude of encryption keys, commonly referred to as traffic encryption keys (TEKs), so that different encryption keys can be used for different purposes and at different times. When a different key is to be used for a communication session, the radio is required to first undergo a rekeying process, which can be performed using a key variable loader (KVL) or through use of a key management controller (KMC) as next described.

Generally, a KMC may be employed to rekey the radios in the system using a process referred to in the art as over-the-air-rekeying (OTAR). To facilitate receipt of OTAR messages, each radio might contain two key encryption keys (KEKs), i.e., keys used to decrypt rekeying messages to obtain a new TEK. One KEK is unique to the radio and is typically referred to as the unique key encryption key (UKEK), while the other KEK is common to a group of radios (e.g., talk group) and is typically referred to as the common key encryption key (CKEK). The OTAR messages contain TEKs for voice/data use and can be sent to a single radio using that radio's UKEK, or to a group of radios using the group's CKEK.

As an example of how the two KEKs are used, groups of radios are rekeyed by sending OTAR messages encrypted with the CKEK. However, this process may not result in all the radios being rekeyed—e.g., some may have been turned off or out of range when the OTAR message was sent. In this event, the units in the group that do not acknowledge receipt of the CKEK rekey sequence must be rekeyed individually. OTAR messages encrypted with the individual units UKEK are then sent to each of the individual units that did not acknowledge the CKEK encrypted OTAR message. In this manner, the traffic encryption key—or keys, for a multiple key system—are updated using OTAR messages and stored in the radio's internal memory.

However, the foregoing scheme has several limitations that may result in breaches in security—e.g., during a private call. In particular, a single TEK system can guarantee security only from radios outside the group, as each radio in the group must have the same TEK. In such systems, private calls between two subscribers are not possible. In a multiple TEK system, there is some degree of security from group members, but the level of security is limited by the number of keys that can be stored. In particular, TEK storage in the radio is limited, so it would be impractical—if not impossible—to provide a different TEK for every possible call.

Using as an example a secure, private call between two parties, a TEK storage location is used for all such calls in the system. The shared use of a limited number—often only one key—of private call TEKs does not provide security internal to the system because all units contain the private call TEK(s). Typically, for a particular call type (e.g., a private call), the group is assigned a single TEK for use in all calls of this type. Thus, group members that are not participants in a private call, for example, would simply need to scan the available frequencies to engage the private call using the single TEK reserved for such calls.

Accordingly, there exists a need for a secure communication system that is not constrained by the shortcomings of the prior art. In particular, such a system would be capable of providing secure communications to a selective group of radios in a manner that could not be readily compromised. Further, such a system that took advantage of OTAR capabilities of today's systems to facilitate secure communications in a private call, would be an improvement over the prior art.

DETAILED DESCRIPTION OF THE PREFERRED EMBODIMENT

Generally, the present invention encompasses a method for providing secure communications for identified members of a requested call. A key management controller first determines when the requested call has been initiated, then identifies the intended members—i.e., radios—for that call. A call key is then transmitted to each of the identified members and used by those members for the duration of the requested call. In this manner, secure communications can be provided to selected members of a larger communication system group.

Figures 1, 2, 3:
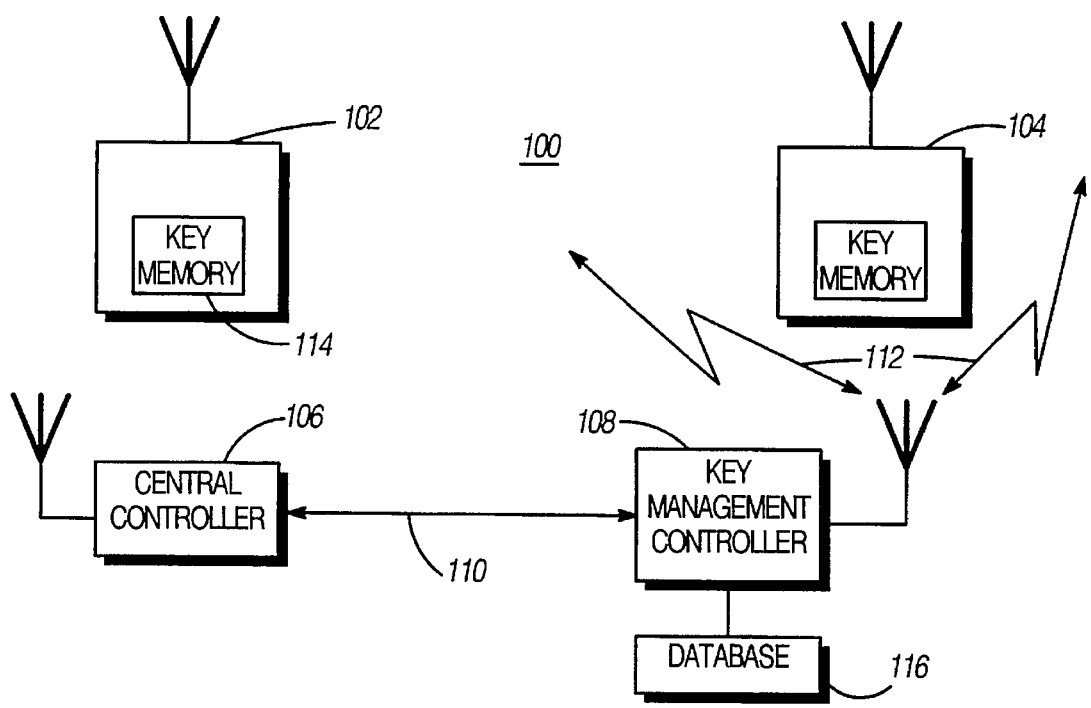
FIG. 1 shows a simplified block diagram of a secure communication system, in accordance with the present invention.
FIG. 2 shows a more detailed description of a key memory element shown in FIG. 1.
FIG. 3 shows a more detailed depiction of the database shown in FIG. 1.

The present invention can be better understood with reference to FIGS. 1–5. FIG. 1 shows a simplified block diagram of a secure communication system 100, in accordance with the present invention. Communication units—or radios—102, 104 represent two of a plurality of such radios in the secure communication system 100. In a preferred embodiment, communication between radios 102, 104 is facilitated by the use of a central controller 106. The central controller 106 functions in a well known manner—i.e., exchanging information with the radios 102, 104 using inbound signaling words (ISWs) and outbound signaling words (OSWs)—as in a so-called trunking system.

To provide security, a Key management controller (KMC) 108, preferably coupled to the central controller 106 via a wireline 110, is used to transmit encryption keys to the radios in the secure communication system 100. This can be accomplished, for example, using over-the-air-rekeying (OTAR) messages 112 for either global or selective distribution, as later described. These transmitted keys, as well as other encryption keys described herein, are stored in a key memory 114 that is included in the radio 102. In a preferred embodiment, a database 116 retains a list of the available encryption keys for the system, as well as the unique key encryption keys (UKEKs) for each of the radios in the system, as later described.

FIG. 2 represents an exemplary depiction of a key memory element 114 as it might be configured in the radio 102. The key memory 114 preferably comprises a plurality of fields 201–211, which may be of identical, or variable, bit lengths. In a preferred embodiment, a unique identifier (ID) for the radio 102 is retained in field 201. This radio ID may comprise a number within a known set of possible unit numbers, depending on the system requirements.

Generally, rekeying of radios is accomplished in the following manner. When the radio 102 receives an OTAR message 112 that is encrypted with a UKEK, it loads its UKEK 203 to decrypt the OTAR message 112. The decrypted OTAR message contains TEKs, which are stored in locations 207–209. When the OTAR message 112 is targeted for several radios, it is encrypted with a CKEK. The radio 102 loads its CKEK 205 to decrypt the OTAR message and recover TEKs 205–209. [It should be noted that the UKEK and CKEK for each radio are known by the KMC 108 and are only used to encrypt/decrypt TEKs for use by the radios. Also, these key encryption keys are typically fixed when the radio is delivered, but are alterable over the air later, if desired.]

As earlier noted, TEKs 207–209 are used for encrypting/decrypting voice/data traffic in the radio for a particular call. In a preferred embodiment, the radio 102 stores 16 TEKs, and these TEKs are preferably changed on a weekly or monthly basis. Further, due to storage limitations, some of the TEKs 207–209 are used for multiple call types-such as dynamic regrouping, telephone interconnect and private calls. Unfortunately, this results in a radio being able to decrypt calls for which it is not an intended member. Lastly, a call key buffer 211 is employed as a temporary residence to contain a call key for use during a private call. In this manner, only members of the call will have the proper encryption key for the call. Upon completion of the call, the call key buffer 211 is disabled by erasure of the call key, thereby ensuring that the call key is used for only one call session. [It should be noted that, for purposes of explanation, the keys shown in FIG. 2 (e.g., 203, 205, 207, 211) are represented using a much smaller number of bits than in a true application. That is, encryption keys may be as long as 200 bytes long, depending on the encryption algorithm used and the level of security desired.

FIG. 3 shows a selected portion of the database 116, in accordance with a preferred embodiment of the present invention. In particular, a data field 302 retains the unique radio IDs (i.e., as represented in field 201 of FIG. 2) for each of the radios in the secure communication system 100. Similarly, a data field 304 is used to retain the unique key encryption keys (UKEKs, as represented in the field 203 shown in FIG. 2) affiliated with the radios identified in the corresponding data field 302.

As an example, the database 116 includes a record 306 that uniquely identifies the radio 102 by its radio ID and by its corresponding UKEK. In this manner, the key management controller 108 is able to maintain the relationship for each radio in the system and its corresponding UKEK. In a preferred embodiment, the radios change UKEKs periodically for long term security, depending on the level of security desired. In particular, the UKEK for each radio in the system is preferably updated on a yearly basis. This process of updating the UKEK is generally not done using OTAR, but rather by a handheld KVL as is known in the art. After updating the UKEK (e.g., during a service call) the KVL reports the update to the KMC.

Figure 4:
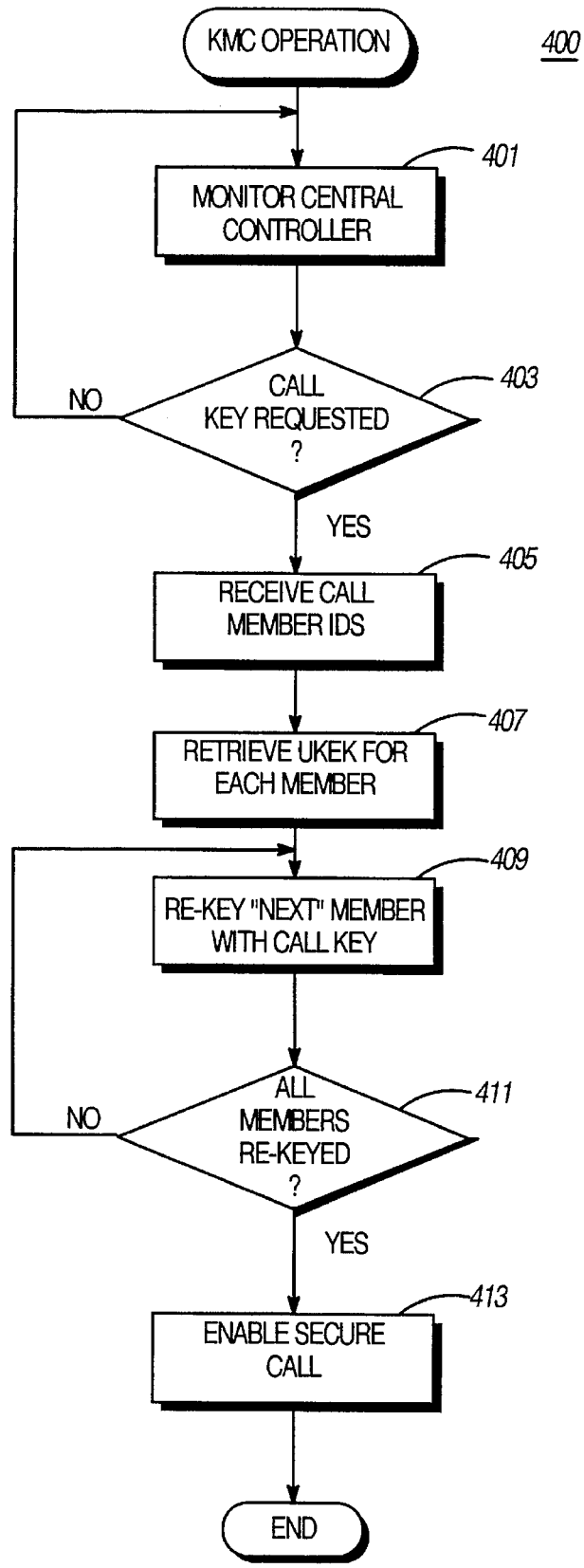
FIG. 4 shows a flow diagram depicting the operation of the key management controller, in accordance with the present invention.

FIG. 4 shows a data flow diagram depicting the operation of the KMC, in accordance with a preferred embodiment of the invention. By monitoring (401) the central controller, the KMC determines (403) whether or not a new call key is being requested. If not, the KMC continues to monitor (401) the central controller. Generally, the central controller in a trunking system assigns frequencies for use during a call and tracks which radios are members of the call. In a conventional system, the KMC monitors all channels in the system for call key requests, and the IDs of the radios in the call are identified via on the air signaling. For ease of understanding, the remainder of the description will focus on the employment of the invention in a trunking system, though the invention is also realizable in a conventional system.

The KMC receives (405) the IDs for each of the members of the call from the central controller. Once the members of the call are known, the KMC retrieves (407) the UKEK for each member of the call. The KMC then rekeys (409) each member of the call by sending the call key to each member radio using the UKEK for that member. This rekeying is repeated until it is determined (411) that all the member radios have been rekeyed. Once all members of the call are rekeyed, the KMC advises those members by sending (413) a secure call enable signal. [It should be noted that in a trunking system this signal might be a command sent on the OTAR channel telling the radios to return to the control channel, while in a conventional system, it would merely be an alerting signal sent on the conventional channel.]

In the foregoing manner, the KMC is used to selectively rekey only those radios that have been identified as members of the requested call. This selective rekeying process provides a distinct advantage over the systems of the prior art, wherein encryption keys are provided on a talk group basis only.

Figure 5:
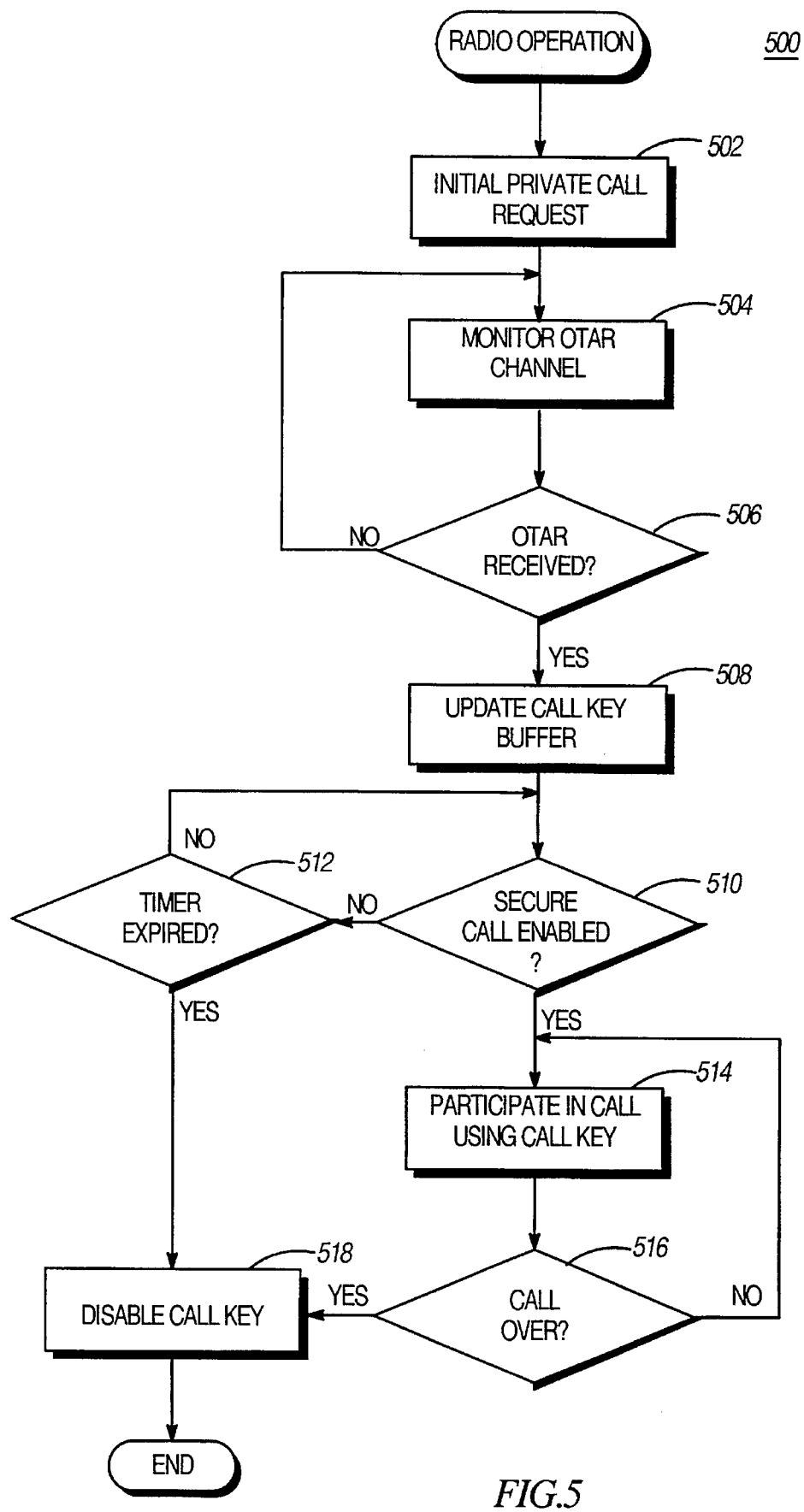
FIG. 5 shows a flow diagram depicting the operation of a secure radio, in accordance with the present invention.

FIG. 5 shows a flow diagram depicting the operation of a radio, in accordance with a preferred embodiment of the invention. In particular, a private call session is used to illustrate how the invention can be employed to provide secure communication between two radios in the talk group. [It should be noted that, while the invention is described in the context of a secure, private call, it is understood by skilled artisans that this context can be extended to include any call requiring selective rekeying.]

A radio initiates (502) a private call by selecting or entering another radio's ID, and transmitting the request using an ISW sent on the control channel. The radio then monitors (504) the OTAR channel, and waits (506) until an OTAR message is received. Once the OTAR message is received, the call key is decrypted using the UKEK for that radio, and the call key buffer is updated (508) with the call key. In a preferred embodiment, the radio waits for the secure call to be enabled before voice/data operations begin. If the secure call enable signal is not received (510) before a predetermined timer expires (512), the call key is disabled (518) and the routine is exited. However, once the secure call enabled signal is received (510)—this is an indication that all members of the call now have the proper call key—the radio is permitted to participate (514) in the call until the call is over. Once it is determined (516) that the call is over, the call key is disabled and the routine is exited.

In the foregoing manner, the present invention overcomes the shortcomings of the prior art by selectively rekeying only those radios that are members of a requested call. In particular, because distribution of the call key is strictly limited to members of the call, the security of the call is preserved. Further, since the call key is disabled at the termination of the call session, long term security is also provided. Lastly, the use of a secure call enabling signal ensures that all of those units in the group that are members of a call are able to participate. Accordingly, a selective rekeying procedure is provided that permits secure communications for private calls, without the need to burden the radio with unduly large memory requirements.

What is claimed is:

1. In a secure communication system that includes a central controller and provides over-the-air-rekeying (OTAR) to a plurality of radios using a key management controller, a method of providing secure communications for a requested call comprising the steps of:

receiving, by the central controller, an inbound signaling word (ISW) including a call type identifying the requested call and an identification for each member of the requested call;

transmitting, by the key management controller, a call key to each member of the requested call; and using, by each member, the call key for the duration of the requested call, such that secure communications between the members of the requested call is provided.

2. The method of claim 1, wherein the step of transmitting comprises the steps of:

determining a unique identifier for each member of the requested call; and using the unique identifiers to selectively rekey the members of the requested call with the call key.

3. The method of claim 2, wherein the step of determining a unique identifier comprises the step of retrieving the unique identifier for each member from a database stored in the key management controller.

4. The method of claim 1, wherein the step of using the call key comprises the steps of:

providing a call key buffer that applies the call key to communications that constitute the requested call; and upon completion of the requested call, disabling the call key buffer.

5. The method of claim 4, further comprising the step of delaying participation in the requested call until each member of the requested call has been rekeyed.

6. In a secure communication system that provides over-the-air-rekeying (OTAR) to a plurality of radios using a key management controller, a method of providing secure communications for a requested call comprising the steps of:

identifying, by the key management controller, which of the plurality of radios are intended to be members of the requested call;

generating, by the key management controller, a unique identifier for each member of the requested call and, on the basis of the unique identifiers, generating a call key;

selectively rekeying, by the key management controller, the members of the requested call on the basis of the unique identifiers and the call key transmitted thereto; and providing, by each member of the requested call, secure communications between the members for the duration of the requested call using the call key.

7. The method of claim 6, wherein the step of generating a unique identifier comprises the step of retrieving the unique identifier for each member from a database stored in the key management controller.

8. The method of claim 6, wherein the step of providing secure communications comprises the steps of:

providing a call key buffer that applies the call key to communications that constitute the requested call; and upon completion of the requested call, disabling the call key buffer.

9. In a secure trunked communication system that includes a central controller and provides over-the-air-rekeying (OTAR) to a plurality of radios using a key management controller, a method of providing secure communications for a requested call comprising the steps of:

receiving, by the central controller, an inbound signaling word (ISW) which includes a call type identifying the requested call and an identification for each member of the requested call;

identifying, by the key management controller, which of the plurality of radios are intended to be members of the requested call on the basis of the ISW and transmitting a call key to the members of the requested call; and providing, by each member, secure communications between the members for the duration of the requested call using the call key.

10. In a secure trunked communication system that includes a central controller and provides over-the-air-rekeying (OTAR) to a plurality of radios using a key management controller, a method of providing secure communications for a private call comprising the steps of:

receiving by the central controller, an inbound signaling word (ISW) which includes a call type identifying the private call and an identification for each member of the private call;

identifying, by the key management controller, which of the plurality of radios are intended to be members of the private call on the basis of the ISW and transmitting a call key to the members of the private call; and providing, by each member, secure communications between the members for the duration of the private call using the call key, and after completion of the private call, disabling the call key.

* * * * *